United States Patent [19]

Vaught

[11] 4,044,553

[45] Aug. 30, 1977

[54] VARIABLE GEOMETRY SWIRLER

[75] Inventor: John M. Vaught, Indianapolis, Ind.

[73] Assignee: General Motors Corporation, Detroit, Mich.

[21] Appl. No.: 714,310

[22] Filed: Aug. 16, 1976

[51] Int. Cl.[2] .................... F02C 9/14

[52] U.S. Cl. .................... 60/39.23; 60/39.65; 60/39.74 R; 239/412; 239/402.5; 239/405; 431/12; 431/351

[58] Field of Search .................... 60/39.23, 39.27, 39.29, 60/39.65, 39.74 R; 431/12; 239/412, 402.5, 405

[56] References Cited

U.S. PATENT DOCUMENTS

| | | | |
|---|---|---|---|
| 2,485,207 | 10/1949 | Logan | 60/39.23 UX |
| 2,644,299 | 7/1953 | Williams | 60/39.23 |
| 2,655,787 | 10/1953 | Brown | 60/39.23 |
| 3,982,392 | 9/1976 | Crow | 60/39.23 |
| 4,006,589 | 2/1977 | Schirmer | 60/39.23 |

*Primary Examiner*—Clarence R. Gordon
*Attorney, Agent, or Firm*—J. C. Evans

[57] ABSTRACT

A combustor for a gas turbine engine has a prevaporization chamber wall having a plurality of air passages therethrough and wherein a variable geometry air flow control element is located in overlying relationship with the air passages to control air flow therethrough. A fuel injector is located concentrically within the chamber for supplying fuel for combustion with air supplied thereto and a hydraulic control actuator is located in surrounding relationship with the injector immediately outboard of the chamber including the hydraulic actuator having pressure supplied thereto from the fuel flow through the nozzle and including means for coupling the actuator directly to the control element for increasing primary air flow in accordance with increased fuel flow to the prevaporization chamber.

2 Claims, 4 Drawing Figures

VARIABLE GEOMETRY SWIRLER

Figure 1:
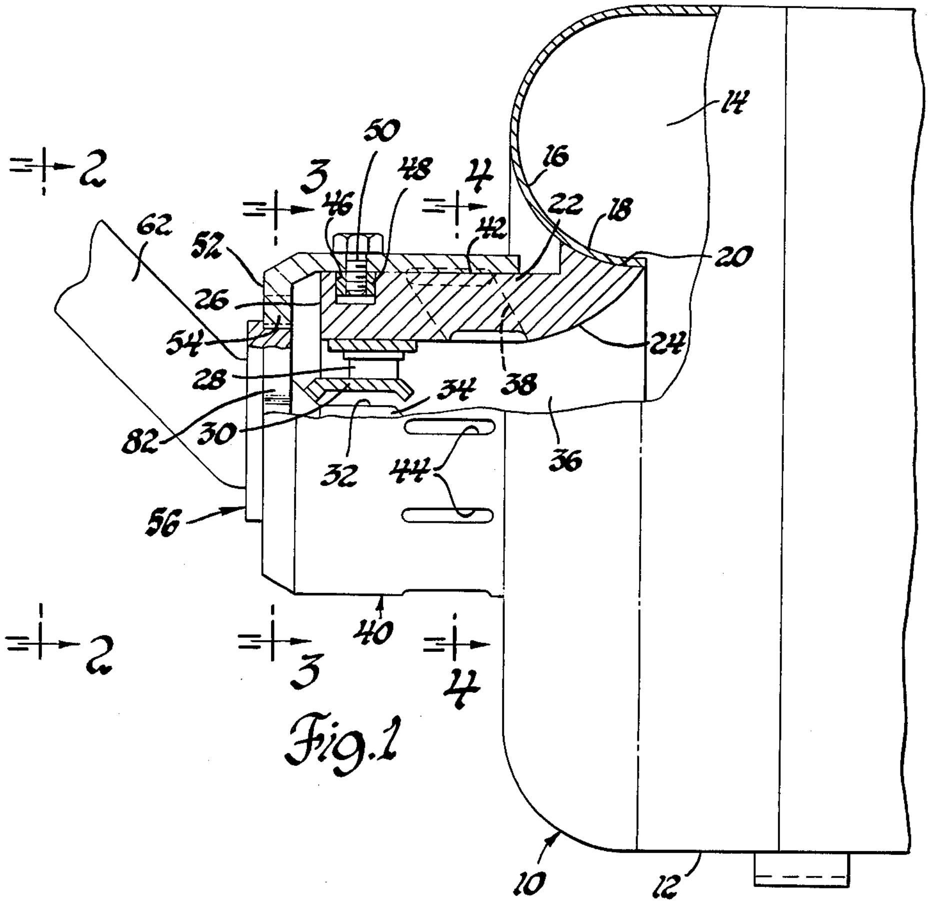

This invention relates to combustion apparatus and more particularly to combustion apparatus having a premixing and prevaporization chamber at the inlet end thereof and including means for controlling the ratio of primary air flow and fuel to the premixing and prevaporization chamber.

Various proposals have been suggested to maintain a desired ratio of primary air and fuel flow into a premixing and prevaporization chamber at the inlet end of a combustor for use in gas turbine engine applications. One example of such a system is set forth in U.S. Pat. No. 3,899,881 issued Aug. 19, 1975, to John R. Arvin et al. In this arrangement a prevaporization chamber wall has a plurality of air passages therein under the control of a slidable vane element which has an actuator requiring external linkage through the combustor case of the engine.

Another example of such combustion apparatus is set forth in U.S. Pat. No. 3,490,230 issued Jan. 20, 1970, to Pillsbury et al. In this arrangement an air control shutter is located around a nozzle for supplying fuel to combustion apparatus. Moreover, the control shutter is rotated to control air flow into the combustion chamber by a suitable mechanical operator again requiring the linkage extending externally of a case for the combustion apparatus.

An object of the present invention is to improve the control of air swirl into a reaction chamber of a combustion apparatus of the type having a fuel injector located at the inlet end of a combustor liner by the provision of a hydraulic actuator located in surrounding relationship of the neck of a fuel supply injector to the combustor immediately outboard of the inlet end of the combustor and wherein the hydraulic actuator includes a variable volume chamber located in fluid communication with a fuel supply to the combustor and an actuated portion directly coupled to a closely adjacent variable geometry control element for varying the volume of air flow into a reaction chamber immediately downstream of the fuel injector.

Yet another object of the present invention is to provide an improved actuator for controlling a variable geometry control element to regulate quantity of air flow into a reaction chamber of a combustion apparatus for gas turbine engines by the provision of a hydraulic actuator located in close, surrounding relationship to the neck of a fuel injector for supplying fuel to the inlet end of the combustor; the actuator including an inlet in communication with a fuel source for the injector; the actuator further including means responsive to increases in fuel supply pressure to produce a resultant high order output force for actuation of the variable geometry element to control air flow into the combustor without the need for linkage external to the case of the combustor and wherein the fuel flow into the hydraulic actuator for operation thereof cools relatively rotatable portions of the actuator to maintain freedom of movement therebetween.

Still another object of the present invention is to provide an improved premixing configuration for a combustion apparatus for use in gas turbine engines including a premixing wall having a row of axial swirler blades at the inlet end thereof located radially outwardly of and circumferentially around the outlet of an air spray nozzle having a neck extending externally of the combustion apparatus and wherein a rotary actuator of the hydraulic type is located in surrounding relationship to the neck and includes a first portion fixedly secured to the neck and a second portion movable relative to the neck with the first and second portions defining a variable volume chamber therebetween in communication with fuel supply through the nozzle; the prechamber wall having a plurality of primary air flow passages therein downstream of the air swirler and nozzle and including a rotatable sleeve in overlying relationship therewith with ports selectively moved into and out of alignment with the primary air passages for controlling the volume of primary air flow into the prechamber and wherein the rotatable sleeve includes lug means thereon for coupling the sleeve to the second portion of the hydraulic actuator so as to cause the rotatable sleeve to be positioned in accordance with pressure of fuel flow through the nozzle into the prevaporization chamber.

Further objects and advantages of the present invention will be apparent from the following description, reference being had to the accompanying drawings wherein a preferred embodiment of the present invention is clearly shown.

Figure 2:
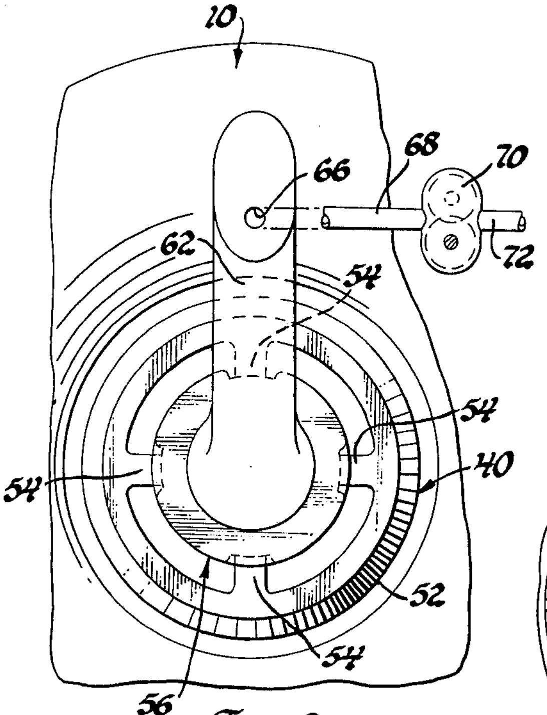
Figure 3:
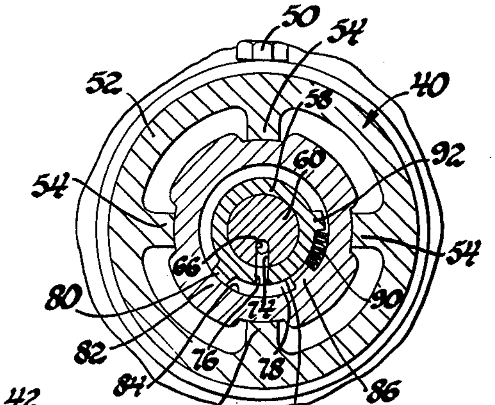
Figure 4:
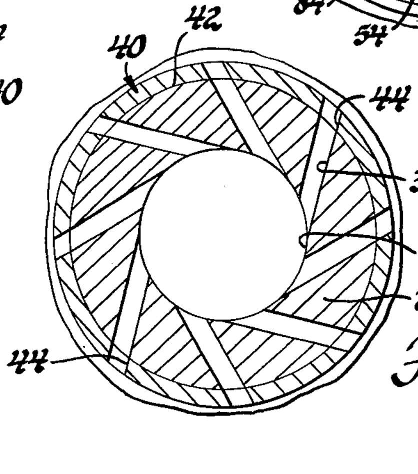

FIG. 1 is an end elevational view, partially broken away and sectioned of the inlet end of a combustion apparatus including the improved air swirler actuation system of the present invention;

FIG. 2 is an end elevational view taken along the line 2—2 of FIG. 1, and being partially sectioned to shown a hydraulic actuator of the present invention; and FIGS. 3 and 4 are vertical sectional views taken along the lines 3—3 and 4—4, respectively, of FIG. 1.

Referring now to the drawing, in FIG. 1, a combustion apparatus 10 is illustrated which forms part of a gas turbine engine such as those described in U.S. Pat. Nos. 3,077,074 issued Feb. 12, 1963, to Collman et al; 3,267,674, issued Aug. 23, 1966, to Collman et al, and 3,490,746 issued Jan. 20, 1970, to Bell. The combustion apparatus 10 includes a downstream liner 12 that bounds a reaction chamber or combustion zone 14. The upstream end of the liner 12 is representatively shown as including a reverse flow, inwardly converging curvilinear annular segment 16 that forms an annular support 18 for an annular surface 20 on the outlet of a tubular member 22 at the inlet of apparatus 10. The tubular member 22 includes an inner peripheral wall 24 thereon extending from its inlet end 26 to the outlet thereof. The inner peripheral wall 24 supportingly receives a ring of axial swirler blades 28 at the inlet end 26. The swirler vanes 28 include an annular, radially inwardly located support member 30 for supporting the air swirler vane 28 at a point radially outwardly of the outer periphery 32 of an air spray nozzle 34 for directing fuel spray into a premixing chamber 36 located immediately downstream of both the outlet of the nozzle 34 and the swirler vane array 28.

The tubular member 22 defining the premixing chamber 36, includes a plurality of radially inwardly directed, primary air flow passages 38 therein each being formed tangentially to the inner peripheral wall 24, as best shown in FIG. 4, for producing a swirl of air into the premixing chamber 36 downstream of and supplemental to that of the air swirl produced by the vanes 28 at the inlet end of the member 22. The combination of air spray dispersion of fuel from the nozzle 34, along with the inlet swirl produced through the vanes 28 and the additional tangential flow of swirling air through the passages 38 cooperate to produce a substantial mixing of air/fuel in the premixing chamber 36 upstream of the reaction chamber 14 so as to improve the combustion of fuel within chamber 14.

In accordance with the principles of the present invention, each of the passages 38 is covered by an adjustable control ring or sleeve 40 that is located radially outwardly of and supported for rotation with respect to the outer peripheral surface 42 of the member 22 as best shown in FIG. 4. The control sleeve 40 includes a plurality of ports 44 selectively aligned with the passages 38 in accordance with the rotative position of the control ring 40 on the member 22. The sleeve 40 is axially indexed with respect to the passages 38 by means of a slot 46 formed annularly in the member 22 adjacent the inlet end 26 thereof. It includes an index ring 48 which threadably receives a screw 50 for fixing the sleeve 40 axially on the outer end of the member 22. The sleeve 40 further includes an end flange 52 thereon extending circumferentially around the outboard end of the sleeve 40. Flange 52 has a plurality of radially inwardly directed lugs 54 thereon operatively associated with a hydraulic operator 56 in accordance with the present invention. The hydraulic operator 56, more particularly, includes a radially inwardly directed portion 58 located circumferentially around a circular segment 60 of a nozzle stem 62 that extends outboard of the nozzle 34 as shown in FIG. 1. The stem 62 includes a fuel passage 66. The fuel passage 66 is in communication with the fuel supply conduit 68 from a pump 70 having an inlet 72 in communication with a suitable fuel supply.

In accordance with certain of the principles of the present invention the circular portion 60 of the stem 62 as shown in FIG. 2 has a fuel passage 66 directed therethrough. It, in turn, is in communication with aligned radial passages 74, 76 in stem portion 60 and portion 58, respectively, for supplying fuel into a variable volume chamber 78. The variable volume chamber 78 is formed between a radially outwardly directed vane 80 on the first portion 58 of the hydraulic operator 56. The first portion 58 is fixed with respect to the stem whereby the vane 80 is fixed. The operator 56 further includes a radially outwardly directed movable portion 82 including an inner peripheral wall 84 slidably movable with respect to the outer periphery of the vane 80 and including a radially inwardly directed vane 86 thereon having its tip slidably movable with respect to an outer periphery 88 of the inner portion 58. The variable volume chamber 78 is formed between the fixed vane 80 and the movable vane 86 as shown in FIG. 3. The movable vane 86 is in abutment with one end of a return spring 90 having the opposite end thereof in engagement with a radially outwardly directed fixed abutment 92 on the inner fixed member 58 of the actuator 56.

By virtue of the aforedescribed arrangement, during gas turbine engine operation, as greater fuel flow is directed through the air spray nozzle 34 the pump 70 will increase the fuel pressure within the passage 66 and within the chamber 78. The increased pressure will react against the vane 86 to cause the spring 90 to be compressed and thereby cause the sleeve 40 to move in a clockwise direction so as to locate a greater part of the ports 44 in the sleeve in overlying relationship with the slotted passages 38 thereby to increase primary air flow into the premixing chamber 36.

During low load operating modes, the pump 70 will supply a lesser quantity of fuel at a lower pressure in the passage 66 thereby causing the spring 90 to return the rotatable outer portion 82 of the actuator 56 in a clockwise direction so as to move the ports 44 in the sleeve 40 out of alignment with the passages 38 thereby to reduce flow of primary air flow into the premixing chamber 36.

This desirable control action is accomplished by means of an actuator and control sleeve configuration fit on the outboard end of a prevaporization chamber for a gas turbine combustor. The assembly is compactly configured and eliminates the need for operating linkage components extending outwardly of the confine of the combustion apparatus and which must penetrate the outer combustion case necessitating special sealing.

Moreover, the provision fuel as the hydraulic actuating media and the utilization of the pressurization of increased fuel flow produced during high load gas turbine engine operating conditions produces immediate response. Moreover, the actuating fluid cools the actuator 56 so as to cause free relative movement between fixed and movable portions thereof by prevention of thermal interference therebetween. This assures proper position of control sleeve 40 with respect to the flow passages 38 in the premixing chamber wall 22.

In one working embodiment, the fuel pressure in the passage 66 produced fuel flow in the order of 80 to 120 pounds per hour at idle fuel flow conditions of operation. Fuel pressures in excess of those required to maintain idle fuel flow, initiated movement of the outer portion 82 so as to initiate opening of the passages 38 by alignment of ports 44 with passages 38 by positioning of the sleeve 40 as set forth above. The pressure fluid and the selection of the spring force of return spring 90 provide a sufficient and reliable level of force for positioning the control sleeve 40.

While the embodiments of the present invention, as herein disclosed, constitute a preferred form, it is to be understood that other forms might be adopted.

The embodiments of the invention in which an exclusive property or privilege is claimed are defined as follows:

1. A variable swirler assembly for controlling air swirl into the inlet of a combustor having fuel supplied thereto by a pump operative in accordance with turbine engine operation comprising an open ended tubular member having one end thereof for connection to the inlet of a combustor, said tubular member having a wall with a plurality of inflow passages therethrough to direct an air swirl into the combustor inlet, a variable geometry element supported on the outer periphery of said tubular member in overlying relationship with said inflow passages to control air flow therethrough, a nozzle directed through the opposite end of said tubular member including an inboard peripheral surface and an outboard stem portion, an actuator supported on said nozzle between said inboard peripheral surface and said outboard stem portion, said actuator including a first wall portion fixedly secured to said stem, a second movable portion on said actuator, means for connecting said movable wall portion to said sleeve for rotating it with respect to said inflow passages, said nozzle having a fuel passage therein, said pump increasing fuel flow through said passage in accordance with engine operation, means forming a variable volume chamber in said actuator including a port for receiving fuel from said fuel passage to produce relative movement between said first portion and said movable portion to shift said variable geometry element with respect to said inflow passages to produce an incresed amount of air swirl into said inlet in accordance with increases in fuel flow through said nozzle thereby to improve mixture of air and increasing quantities of fuel flow to the combustor during engine operation.

2. A variable swirler assembly for controlling air swirl into the inlet of a combustor having fuel supplied thereto by a pump operative in accordance with turbine engine operation comprising an open ended tubular member having one end thereof for connection to the inlet of a combustor, said tubular member having a wall with a plurality of inflow passages therethrough to direct an air swirl into the combustor inlet, a rotatable, ported sleeve supported on the outer periphery of said tubular member in overlying relationship with said inflow passages to control air flow therethrough, a nozzle directed through the opposite end of said tubular member including an inboard peripheral surface and an outboard stem portion, an actuator supported on said nozzle between said inboard peripheral surface and said outboard stem portion, said actuator including a first portion fixedly secured to said stem, a second movable portion on said actuator, means for connecting said movable portion to said sleeve for rotating it with respect to said inflow passages, said nozzle having a fuel passage therein, said pump increasing fuel flow through said passage in accordance with engine operation, means forming a variable volume chamber in said actuator including a port for receiving fuel from said fuel passage to produce relative movement between said first portion and said movable portion to shift said sleeve with respect to said inflow passages to produce an increased amount of air swirl into said inlet in accordance with increases in fuel flow through said nozzle thereby to improve mixture of air and increasing quantities of fuel flow to the combustor during engine operation.

* * * * *